United States Patent
Ooura et al.

(10) Patent No.: US 7,001,960 B2
(45) Date of Patent: Feb. 21, 2006

(54) PROCESS FOR PRODUCING VINYL CHLORIDE-BASED POLYMER

(75) Inventors: Makoto Ooura, Kashima-gun (JP); Tadashi Amano, Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/067,717

(22) Filed: Mar. 1, 2005

(65) Prior Publication Data

US 2005/0197476 A1 Sep. 8, 2005

(30) Foreign Application Priority Data

Mar. 2, 2004 (JP) .............................. 2004-057413

(51) Int. Cl.
*C08F 2/20* (2006.01)

(52) U.S. Cl. ...................... 526/78; 526/200; 526/202

(58) Field of Classification Search ............... 526/200, 526/202, 78
See application file for complete search history.

(56) References Cited

U.S. PATENT DOCUMENTS

| 4,845,174 A | * | 7/1989 | Amano et al. ................ 526/62 |
| 5,204,421 A | | 4/1993 | Amano et al. |

FOREIGN PATENT DOCUMENTS

GB  1 524 492  9/1978

* cited by examiner

*Primary Examiner*—Fred Teskin
(74) *Attorney, Agent, or Firm*—Oblon, Spivak, McClelland, Maier & Neustadt, P.C.

(57) ABSTRACT

A process for producing a vinyl chloride-based polymer by suspension polymerization is provided. The polymerization is initiated in the presence of (A) a particular hydroxypropylmethylcellulose, (B) a particular partially saponified PVA with a saponification degree of 75 to 85 mol % and an average polymerization degree of 1000 to 3000, and (C) a particular partially saponified PVA with a saponification degree of 20 to 57 mol % and an average polymerization degree of 150 to 600 in a specified ration, and said (C) is also additionally added to the polymerization system when a conversion rate is 15–50%. Polymers with a high porosity, excellent plasticizer absorption, extremely low levels of fish eyes, and a high bulk specific gravity are produced at a high level of productivity.

8 Claims, No Drawings

PROCESS FOR PRODUCING VINYL CHLORIDE-BASED POLYMER

BACKGROUND OF THE INVENTION

1. Field of the Invention

The present invention relates to a process for producing a vinyl chloride-based polymer, and more particularly to a process for producing a vinyl chloride-based polymer with a high porosity, favorable plasticizer absorption, extremely low levels of fish eyes, and a high bulk specific gravity.

2. Description of the Prior Art

Vinyl chloride-based polymers are very useful resins that display excellent physical properties, and both hard and soft polymers are used in a wide variety of applications. In those fields where soft polymers are used, a variety of plasticizers are also used, meaning one of the important characteristics required of the vinyl chloride-based polymer is superior plasticizer absorption. In order to improve plasticizer absorption, the particles of the vinyl chloride-based polymer must be made more porous.

A multitude of processes for producing vinyl chloride-based polymers with excellent plasticizer absorption have already been proposed. For example, a process has been proposed for producing a porous vinyl chloride-based polymer by conducting a suspension polymerization of vinyl chloride in the presence of a partially saponified polyvinyl alcohol with a saponification degree of 37 to 70 mol % and a polymerization degree of 160 to 500 (see patent reference 1).

Furthermore, a process has also been proposed for producing a vinyl chloride-based polymer with superior plasticizer absorption by using (A) a partially saponified polyvinyl alcohol with an average polymerization degree of 1500 to 2700, and a saponification degree of 75 to 85 mol %, and (B) hydroxypropylmethylcellulose with a degree of methoxy group substitution of 26 to 30% by mass, a degree of hydroxypropoxy group substitution of 4 to 15% by mass, and a viscosity at 20° C. for a 2% by mass aqueous solution thereof of 5 to 4000 mPa·s as dispersion stabilizers, and then adding (C) a partially saponified polyvinyl alcohol with an average polymerization degree of 150 to 600, and a saponification degree of 20 to 55 mol % to the polymerization reaction system when the polymerization conversion is within a range from 5 to 50% (see patent reference 2).

In recent years, the potential applications for vinyl chloride-based polymers have become even more diverse, and the variety of plasticizers used has also expanded. Particularly in those cases where polymer-based plasticizers such as polyesters are used, vinyl chloride-based polymers with even better levels of plasticizer absorption than have conventionally been required are now becoming necessary.

Typically, as the level of plasticizer absorption is improved, a corresponding reduction in the bulk specific gravity tends to be observed. However, marked reductions in the bulk specific gravity are undesirable.

According to these processes described in the conventional technology, vinyl chloride-based polymers with a certain level of porosity and favorable plasticizer absorption can be obtained. However, if a large quantity of a polyvinyl alcohol with a low saponification degree is used in the early stages of the polymerization, with the intention of producing a vinyl chloride-based polymer with even better plasticizer absorption, then the protective colloid provided on the surface of the monomer droplets immediately following polymerization initiation is rapidly degraded, meaning the product polymer tends to form as coarse particles or lumps. Furthermore, foaming becomes more vigorous during recovery of the unreacted monomer, thus lengthening the time required for the unreacted monomer recovery step, and causing a marked deterioration in the productivity.

On the other hand, if the process proposed in the aforementioned patent reference 2 is followed, and a large quantity of a polyvinyl alcohol with a low saponification degree is added partway through the polymerization, then although the problem of the product polymer forming as coarse particles or lumps does not arise, the quantity of residual low saponification degree polyvinyl alcohol that remains within the liquid phase of the polymer slurry following completion of the polymerization increases, meaning foaming becomes more vigorous during recovery of the unreacted monomer, causing a marked deterioration in the productivity. Furthermore, although a vinyl chloride-based polymer produced by this process displays improved plasticizer absorption, the reduction in the bulk specific gravity is undesirably large.

[Patent Reference 1] GB Patent No. 1,524,492

[Patent Reference 2] U.S. Pat. No. 5,204,421

SUMMARY OF THE INVENTION

An object of the present invention is to provide a vinyl chloride-based polymer with a high porosity, excellent plasticizer absorption, extremely low levels of fish eyes, and a high bulk specific gravity, at a high level of productivity.

As a result of intensive investigations aimed at achieving the above object, the inventors of the present invention were able to complete the present invention.

Thus, the present invention provides a process for producing a vinyl chloride-based polymer, comprising a suspension polymerization of either vinyl chloride, or a monomer mixture of vinyl chloride and another copolymerizable monomer, in an aqueous medium, and in the presence of a dispersion stabilizer, wherein the dispersion stabilizer comprises (A) hydroxypropylmethylcellulose with a degree of methoxy group substitution of 26 to 30% by mass, a degree of hydroxypropoxy group substitution of 4 to 15% by mass, and a viscosity at 20° C. for a 2% by mass aqueous solution thereof of 5 to 4000 mPa·s, (B) a partially saponified polyvinyl alcohol with a saponification degree of 75 to 85 mol % and an average polymerization degree of 1000 to 3000, and (C) a partially saponified polyvinyl alcohol with a saponification degree of 20 to 57 mol % and an average polymerization degree of 150 to 600, the suspension polymerization is initiated in the presence of (A), (B), and (C), and the respective quantities of (A), (B), and (C) at polymerization initiation satisfy the conditions prescribed by a formula (1) and a formula (2) shown below:

$$\text{mass of } (A)/\text{mass of } (B)=2 \text{ or greater} \quad (1)$$

$$0.2 \leq \text{mass of } (C)/\{\text{mass of } (A)+\text{mass of } (B)\} \leq 1 \quad (2)$$

and when the polymerization conversion fate is within a range from 15 to 50%, an additional quantity of (C) is added to the polymerization reaction system.

According to a process for producing a vinyl chloride-based polymer of the present invention, a vinyl chloride-based polymer with a high porosity, excellent plasticizer absorption, extremely low levels of fish eyes, and a high bulk specific gravity can be produced with good productivity.

DETAILED DESCRIPTION OF PREFERRED EMBODIMENTS

As follows is a more detailed description of the present invention.

[Dispersion Stabilizer]

In a process of the present invention, a dispersion stabilizer is used that comprises the aforementioned components (A), (B), and (C) as essential components.

<Component (A)>

The component (A) is a hydroxypropylmethylcellulose with a degree of methoxy group substitution of 26 to 30% by mass, and preferably from 27 to 30% by mass, a degree of hydroxypropoxy group substitution of 4 to 15% by mass, and preferably from 4 to 12% by mass, and a viscosity at 20° C. for a 2% by mass aqueous solution thereof of 5 to 4000 mPa·s, and preferably from 13 to 1800 mPa·s.

This component (A) is a water-soluble cellulose ether in which the hydroxyl groups of the glucose rings within the cellulose molecule have been substituted with methoxy groups and hydroxypropoxy groups. In this description, the "degree of methoxy group substitution", for example, describes the mass % of the methoxy groups ($CH_3O$—) incorporated within the cellulose ether.

If this degree of methoxy group substitution is less than 26%, or the degree of hydroxypropoxy group substitution is less than 4%, then the plasticizer absorption of the product polymer deteriorates. In contrast, if the degree of methoxy group substitution is greater than 30%, or the degree of hydroxypropoxy group substitution is greater than 15%, then the particle size distribution of the product polymer tends to become undesirably broad.

The component (A) can use either a single material, or a combination of two or more different materials. Furthermore, the quantity of the component (A) is typically within a range from 0.02 to 0.2 parts by mass, and preferably from 0.02 to 0.08 parts by mass, per 100 parts by mass of the vinyl chloride or the monomer mixture of vinyl chloride and another copolymerizable monomer (hereafter referred to as the "charged monomer").

<Component (B)>

The component (B) is a partially saponified polyvinyl alcohol with a saponification degree of 75 to 85 mol %, and preferably from 77 to 82%, and an average polymerization degree of 1000 to 3000, and preferably from 1200 to 2500.

If the saponification degree is less than 75 mol %, or the average polymerization degree is less than 1000, then the product polymer forms as coarser particles, leading to scale adhesion inside the polymerization vessel. In contrast, if the saponification degree is greater than 85 mol %, or the average polymerization degree is greater than 3000, then the plasticizer absorption of the product polymer deteriorates, and fish eyes become more prevalent.

The component (B) can use either a single material, or a combination of two or more different materials. Furthermore, the quantity of the component (B) is typically within a range from 0.001 to 0.1 parts by mass, and preferably from 0.005 to 0.05 parts by mass, per 100 parts by mass of the charged monomer.

<Component (C)>

The component (C) is a partially saponified polyvinyl alcohol with a saponification degree of 20 to 57 mol %, and preferably from 30 to 57%, and an average polymerization degree of 150 to 600, and preferably from 150 to 400.

If the saponification degree is less than 20 mol %, or the average polymerization degree is less than 150, then the product polymer forms as coarser particles, leading to scale adhesion inside the polymerization vessel. In contrast, if the saponification degree is greater than 57 mol %, or the average polymerization degree is greater than 600, then the plasticizer absorption of the product polymer is unsatisfactory. The component (C) can use either a single material, or a combination of two or more different materials.

In the production process of the present invention, the component (C) is placed in the polymerization vessel, together with the components (A) and (B), prior to initiation of the polymerization reaction. Furthermore, an additional quantity of the component (C) is also added to the polymerization reaction system following polymerization initiation, as described below.

The quantity of the component (C) added prior to initiation of the polymerization reaction is preferably within a range from 0.01 to 0.05 parts by mass, and even more preferably from 0.015 to 0.04 parts by mass, per 100 parts by mass of the charged monomer. If this quantity is too small, then the plasticizer absorption of the product polymer deteriorates, whereas if the quantity is too large, the product polymer becomes overly coarse.

<Quantities of Components (A), (B), and (C)>

In the process of the present invention, the suspension polymerization is initiated in the presence of the components (A), (B), and (C). The respective quantities of (A), (B), and (C) at initiation must satisfy the conditions prescribed by a formula (1) and a formula (2) shown below:

$$\text{mass of } (A)/\text{mass of } (B) = 2 \text{ or greater} \tag{1}$$

$$0.2 \leq \text{mass of } (C)/\{\text{mass of } (A) + \text{mass of } (B)\} \leq 1 \tag{2}$$

In the above formula (1), if the value of "mass of (A)/mass of (B)" is less than 2, then the bulk specific gravity of the product polymer falls significantly. In order to obtain a vinyl chloride-based polymer with good plasticizer absorption and a high bulk specific gravity, the value of "mass of (A)/mass of (B)" must be at least 2, and is preferably within a range from 2.3 to 9.

In the above formula (2), if the value of "mass of (C)/{mass of (A)+mass of (B)}" is less than 0.2, then the plasticizer absorption of the product polymer deteriorates, whereas if the value exceeds 1, the product polymer becomes overly coarse. Preferred values for "mass of (C)/{mass of (A)+mass of (B)}" are within a range from 0.5 to 0.9.

[Addition of the Component (C) to the Polymerization Reaction System]

In the process of the present invention, an additional quantity of the partially saponified polyvinyl alcohol of the component (C) must be added to the polymerization reaction system following initiation of the polymerization reaction, at a point where the polymerization conversion is within a range from 15 to 50%. Addition of the component (C) when the polymerization conversion is within a range from 25 to 50% is particularly preferred.

If the component (C) is added before the polymerization conversion has reached 15%, then the product polymer becomes overly coarse, whereas if the component (C) is added once the polymerization conversion has already exceeded 50%, then the plasticizer absorption of the product polymer deteriorates, and foaming becomes more vigorous during recovery of the unreacted monomer, thus lengthening the time required for the unreacted monomer recovery step, and causing a marked deterioration in the productivity.

The quantity of the component (C) added to the polymerization reaction system is preferably within a range from 0.01 to 0.07 parts by mass, and even more preferably from 0.02 to 0.06 parts by mass, per 100 parts by mass of the charged monomer. If this quantity is too small, then the plasticizer absorption deteriorates, whereas if the quantity is too large, then foaming becomes more vigorous during recovery of the unreacted monomer, causing a marked deterioration in the productivity. There are no particular restrictions on the operation of adding the component (C) to the polymerization reaction system, and the predetermined quantity of the component (C) may be either added at a time, or added in two portions.

<Polymerization Conversion Rate>

In the present invention, the polymerization conversion was calculated by conducting a polymerization reaction in a 5 L polymerization vessel, and then calculating the polymerization conversion based on the results of determining the relationship between the polymerization time and the polymerization conversion.

In other words, 2600 g of deionized water, 13 g of a 2% by mass aqueous solution of a partially saponified polyvinyl alcohol with a saponification degree of 80.5 mol %, and 52 g of a 2% by mass aqueous solution of a hydroxypropylmethylcellulose with a degree of methoxy group substitution of 28.5% by mass and a degree of hydroxypropoxy group substitution of 8.9% by mass were added in a stainless steel polymerization vessel with an internal capacity of 5 L. The inside of the polymerization vessel was then degassed until the internal pressure reached 8 kPa·abs, and 1300 g of vinyl chloride monomer was added. With the mixture undergoing stirring, a predetermined quantity of a predetermined polymerization initiator was added, and at the same time the raising of the temperature was started. When the temperature inside the polymerization vessel reached a predetermined polymerization temperature, that temperature was maintained and the polymerization was allowed to proceed. One hour after the start of the temperature raising process, 26 g of a 10% by mass aqueous solution of sodium nitrite was added to completely halt the polymerization, and any unreacted monomer was recovered. The total mass of the vinyl chloride-based polymer obtained by dewatering and drying the polymer slurry was weighed, and the polymerization conversion at the point 1 hour after the start of the temperature raising was determined.

Using the same method, the polymerization conversion were determined at subsequent 30 minute intervals, namely at 1.5 hours, 2 hours, 2.5 hours, 3 hours, 3.5 hours, 4 hours, 4.5 hours, and 5 hours after the start of the temperature raising, and the relationship between the polymerization time and the polymerization conversion was determined.

This relationship between the polymerization time and the polymerization conversion was generated for each quantity of each of the required polymerization initiators, and each polymerization temperature. Incidentally, the relationship between the polymerization time and the polymerization conversion hardly depends on a dispersing agent used, a dispersing agent with a most general composition was used.

[Other Polymerization Conditions]

In a process for producing a vinyl chloride-based polymer according to the present invention, with the exceptions of using a specific dispersion stabilizer as described above, and restricting the quantity added, and the point of addition of that dispersion stabilizer, the production process can be conducted under the same conditions as those used in conventional vinyl chloride-based polymer production processes.

<Monomer>

The monomer raw material used in the present invention is either vinyl chloride, or a monomer mixture comprising vinyl chloride as the primary constituent. A monomer mixture comprising vinyl chloride as the primary constituent comprises at least 50% by mass of vinyl chloride, as well as another monomer which is copolymerizable with the vinyl chloride. Examples of other monomers which are copolymerizable with vinyl chloride include vinyl esters such as vinyl acetate and vinyl propionate; acrylate esters or methacrylate esters such as methyl acrylate and ethyl acrylate; olefins such as ethylene and propylene; as well as other monomers such as maleic anhydride, acrylonitrile, styrene and vinylidene chloride. These monomers may be used singularly, or in combinations of two or more different monomers.

<Polymerization Initiator>

There are no particular restrictions on the polymerization initiator used in a process of the present invention, and the types of initiators used in conventional vinyl chloride-based polymer production are suitable. Examples of suitable polymerization initiators include peroxycarbonate compounds such as diisopropyl peroxydicarbonate, di-2-ethylhexyl peroxydicarbonate, diethoxyethyl peroxydicarbonate, and di-sec-butyl peroxydicarbonate; peroxy ester compounds such as t-butyl peroxypivalate, t-hexyl peroxypivalate, t-butyl peroxyneodecanoate, α-cumyl peroxyneodecanoate, t-butyl peroxyneoheptanoate, and t-amyl peroxyneodecanoate; peroxides such as diisobutyryl peroxide, acetylcyclohexylsulfonyl peroxide, 2,4,4-trimethylpentyl-2-peroxyphenoxy acetate and 3,5,5-trimethylhexanoyl peroxide; and azo compounds such as azobis-2,4-dimethylvaleronitrile and azobis(4-methoxy-2,4-dimethylvaleronitrile). These polymerization initiators may be used singularly, or in combinations of two or more different initiators. The quantity added of the polymerization initiator is typically within a range from 0.01 to 1 part by mass per 100 parts by mass of the charged monomer.

<Antioxidants>

There are no particular restrictions on the antioxidants used in the present invention, and the types of antioxidants typically used in conventional vinyl chloride-based polymer production are suitable. Examples of suitable antioxidants include phenol compounds such as 2,2-di(4'-hydroxyphenyl)propane, hydroquinone, p-methoxyphenol, t-butylhydroxyanisole, n-octadecyl-3-(4-hydroxy-3,5-di-t-butylphenyl)propionate, 2,5-di-t-butylhydroquinone, 4,4'-butylidene-bis(3-methyl-6-t-butylphenol), 3,5-di-t-butyl-4-hydroxytoluene, 2,2'-methylene-bis(4-ethyl-6-t-butylphenol), triethylene glycol-bis[3-(3-t-butyl-5-methyl-4-hydroxyphenyl)propionate], pentaerythritol-tetrakis[3-(3,5-di-t-butyl-4-hydroxyphenyl)propionate], 2,6-di-t-butyl-4-sec-butylphenol, 2,6-di-t-butyl-4-methylphenol, t-butylcatechol, 4,4'-thiobis(6-t-butyl-m-cresol), tocopherol, and nor-dihydroguaiaretic acid; semicarbazide derivatives such as semicarbazide, 1-acetylsemicarbazide, 1-chloroacetylsemicarbazide, 1-dichloroacetylsemicarbazide, 1-benzoylsemicarbazide and semicarbazone; thiocarbazide derivatives such as carbohydrazide, thiosemicarbazide and thiosemicarbazone; amine compounds such as phenylnaphthylamine, N,N'-diphenyl-p-phenylenediamine, and 4,4'-bis(dimethylbenzyl)diphenylamine; nitro and nitroso compounds such as nitroanisole, N-nitrosodiphenylamine, nitroaniline, and the aluminum salt of N-nitrosophenylhydroxylamine; phosphorus compounds such as triphenyl phosphite, diphenylisodecyl phosphite, phenyldiisodecyl phosphite, 4,4'-butylidene-bis(3-methyl-6-t-butylphenyl-di-tridecyl phosphite), dioctadecylpentaerythritol diphosphite, tris(nonylphenyl)phosphite, and tris(dinonylphenyl)phosphite; and sulfur compounds such as dilauryl thiodipropionate, dimyristyl thiodipropionate, distearyl thiodipropionate, dodecylmercaptan, and 1,3-diphenyl-2-thiourea. These antioxidants can be used singularly, or in combinations of two or more different compounds.

Of the above antioxidants, from the viewpoints of achieving good anti-initial discoloration of the product polymer, and limiting scale adhesion to the polymerization vessel, 3,5-di-t-butyl-4-hydroxytoluene, triethylene glycol-bis[3-(3-t-butyl-5-methyl-4-hydroxyphenyl)propionate], t-butyl-hydroxyanisole, t-butylhydroquinone, 2,6-di-t-butyl-4-sec-butylphenol, and octadecyl-3-(3,5-di-t-butyl-4-hydroxyphenyl)propionate are preferred.

There are no particular restrictions on the point at which the antioxidants are added, and they may be added prior to polymerization initiation with the aim of reducing fish eyes in the product polymer, during the polymerization reaction with the aim of controlling the progress of unwanted reactions and controlling the polymerization rate, or following completion of the polymerization with the aim of controlling the quality of plasticizer absorption provided by the product polymer. There are no particular restrictions on the method used to add the antioxidant, and typically used methods, including dissolving the antioxidant in an organic solvent such as methanol, ethanol, or acetone prior to addition, adding the antioxidant as a water-based emulsion, or adding the antioxidant in a heated molten state, can all be effectively used.

The quantity of antioxidant added is preferably within a range from 0.0001 to 0.1 parts by mass per 100 parts by mass of the charged monomer.

[Other]

Other conditions associated with the polymerization, such as the method of supplying the aqueous medium, the vinyl chloride or the monomer mixture comprising vinyl chloride, the dispersion assistants, and the polymerization initiator and the like to the polymerization vessel, as well as the relative proportions added and the polymerization temperature and the like, may be similar to conventional processes. Furthermore, if required, other components typically used in the production of vinyl chloride-based polymers, such as polymerization degree regulators, chain transfer agents, and antistatic agents, may also be used.

EXAMPLES

As follows is a more detailed description of the present invention using examples. However, the present invention is in no way limited to the examples presented. Furthermore, in the following description, the component (C) that is added to the polymerization vessel prior to polymerization initiation is referred to as (C-1), whereas the component (C) added to the polymerization reaction system after polymerization initiation is referred to as (C-2).

Example 1

A stainless steel polymerization vessel of internal capacity 2 m$^3$ was charged with 980 kg of deionized water, (A) 166.4 g of hydroxypropylmethylcellulose with a degree of methoxy group substitution of 28.5% by mass and a degree of hydroxypropoxy group substitution of 8.9% by mass, and a viscosity at 20° C. for a 2% by mass aqueous solution thereof of 49 mPa·s, (B) 41.6 g of a partially saponified polyvinyl alcohol with a saponification degree of 80.5 mol % and an average polymerization degree of 2500, and (C-1) 162.5 g of a partially saponified polyvinyl alcohol with a saponification degree of 48 mol % and a polymerization degree of 230. The inside of the polymerization vessel was then degassed until the internal absolute pressure reached 8 kPa·abs, and 650 kg of vinyl chloride monomer was added. With the mixture undergoing stirring, 780 g of t-butyl peroxyneodecanoate was added as a polymerization initiator, while a temperature raising process was started by passing hot water through the jacket. Once the temperature inside the polymerization vessel reached 51.0° C., the polymerization was allowed to proceed with the temperature maintained at that level.

When the polymerization conversion reached 30%, (C-2) a solution containing 195 g of the partially saponified polyvinyl alcohol with a saponification degree of 48 mol % and a polymerization degree of 230 dissolved in a water/methanol mixed solvent was fed into the polymerization vessel with pressure.

When the pressure inside the polymerization vessel had fallen to 0.62 MPa·G, 600 g of a 35% by mass aqueous dispersion of triethylene glycol-bis[3-(3-t-butyl-5-methyl-4-hydroxyphenyl)propionate] was added to the mixture in the polymerization vessel, and the unreacted monomer was then recovered.

During recovery of the unreacted monomer, the speed with which the unreacted monomer was recovered was controlled in accordance with level gauges installed within the polymerization vessel, so that the distance from the highest point inside the polymerization vessel to the liquid level (the highest point of the foam) was at least 20 cm. The time required for the unreacted monomer recovery is shown in Table 1. The polymer slurry was then dewatered and dried, yielding a vinyl chloride polymer.

The bulk specific gravity, average particle size, plasticizer absorption quantity, plasticizer absorption, and the number of fish eyes for the thus obtained polymer were measured using the methods described below. The results are shown in Table 1.

<Bulk Specific Gravity>

This property was measured in accordance with JIS K6720-2.

<Average Particle Size>

Using test sieves prescribed in JIS Z8801, sieves with nominal sizes of 300 μm, 250 μm, 180 μm, 150 μm, 106 μm, and 75 μm were fitted to a Ro-Tap sieve shaker. 100 g of the sample polymer was placed gently in the uppermost stage, and following shaking for 10 minutes, the mass of sample remaining on each of the sieves was measured, and the percentages (A to F) listed below were determined relative to the total mass (100 g). The average particle size was then determined by inserting the oversize fraction rate and undersize fraction for each sieve into the formula shown below.

A: oversize fraction rate (%) for sieve of nominal size 250 μm

B: oversize fraction rate (%) for sieve of nominal size 180 μm

C: oversize fraction rate (%) for sieve of nominal size 150 μm

D: oversize fraction rate (%) for sieve of nominal size 106 μm

E: oversize fraction rate (%) for sieve of nominal size 75 μm

F: undersize fraction (%) for sieve of nominal size 75 μm

Average particle size (μm)={(A×300)+(B×215)+(C×165)+(D×128)+(E×90)+(F×60)}×1/100

<Plasticizer Absorption Quantity>

Glass fiber was packed in the bottom of an aluminum alloy vessel of internal diameter 25 mm and depth 85 mm, and a 10 g sample of the polymer was then placed in the vessel. 15 ml of dioctyl phthalate (DOP) was then added, and the vessel was left to stand for 30 minutes to allow the DOP sufficient time to penetrate into the polymer. Subsequently, excess DOP was removed by centrifuging at an acceleration of 1500 G The quantity of DOP absorbed by the polymer was determined as % by mass relative to the polymer before absorption.

<Plasticizer Absorption>

A 400 g sample of the polymer was placed in a Brabender plastograph fitted with a stirrer, and with the jacket temperature set to 80° C., and after stirring for 4 minutes, once the temperature of the polymer had reached 80° C., 200 g of DOP was added, and the time taken from the start of addition until dry-up (where the rotational torques started to fall) was measured.

<Fish Eyes>

25 g of a compound produced by mixing 100 parts by mass of the sample polymer, 1 part by mass of tribasic lead sulfate, 1.5 parts by mass of lead stearate, 0.2 parts by mass of titanium dioxide, 0.1 parts by mass of carbon black, and 50 parts by mass of DOP was kneaded for 5 minutes at 145° C. using a roller, and a sheet of thickness 0.2 mm was then formed from the mixture. The number of transparent spots per 100 cm² of the sheet was counted.

Example 2

With the exception of adding the component (C-2) described in Example 1 at the point where the polymerization conversion had reached 20%, a vinyl chloride polymer was prepared in the same manner as Example 1, and was then measured in the same manner as Example 1. The results are shown in Table 1.

Example 3

With the exception of altering the quantity of the component (C-2) described in Example 1 from 195 g to 325 g, a vinyl chloride polymer was prepared in the same manner as Example 1, and was then measured in the same manner as Example 1. The results are shown in Table 1.

Comparative Example 1

With the exceptions of altering the quantity of the component (A) described in Example 1 from 166.4 g to 41.6 g, altering the quantity of the component (B) from 41.6 g to 166.4 g, and altering the quantity of the component (C-2) from 195 g to 325 g, a vinyl chloride polymer was prepared in the same manner as Example 1, and was then measured in the same manner as Example 1. The results are shown in Table 1.

Comparative Example 2

With the exceptions of altering the quantity of the component (C-1) described in Example 1 from 162.5 g to 357.5 g, and not adding the component (C-2), a vinyl chloride polymer was prepared in the same manner as Example 1. The product polymer was very coarse, and contained block-like lumps and coarse particles with particle sizes of 1 to 2 mm.

Comparative Example 3

With the exception of not using the component (C-1) described in Example 1, a vinyl chloride polymer was prepared in the same manner as Example 1. The results are shown in Table 1.

Comparative Example 4

With the exceptions of not using the component (C-1) described in Example 1, and altering the quantity of the component (C-2) from 195 g to 357.5 g, a vinyl chloride polymer was prepared in the same manner as Example 1, and was then measured in the same manner as Example 1. The results are shown in Table 1.

Comparative Example 5

With the exceptions of not using the component (C-1) described in Example 1, and altering the quantity of the component (C-2) from 195 g to 520 g, a vinyl chloride polymer was prepared in the same manner as Example 1, and was then measured in the same manner as Example 1. The results are shown in Table 1.

TABLE 1

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Component (A) (g) | 166.4 | 166.4 | 166.4 | 41.6 | 166.4 | 166.4 | 166.4 | 166.4 |
| Component (B) (g) | 41.6 | 41.6 | 41.6 | 166.4 | 41.6 | 41.6 | 41.6 | 41.6 |
| Component (C) (g) | | | | | | | | |
| Prior to polymerization initiation (C-1) | 162.5 | 162.5 | 162.5 | 162.5 | 357.5 | 0 | 0 | 0 |
| After polymerization initiation (C-2) | 195 | 195 | 325 | 325 | 0 | 195 | 357.5 | 520 |
| (A)/(B) | 4.0 | 4.0 | 4.0 | 0.25 | 4.0 | 4.0 | 4.0 | 4.0 |
| (C-1)/{(A) + (B)} | 0.78 | 0.78 | 0.78 | 0.78 | 1.72 | 0 | 0 | 0 |
| Unreacted monomer recovery time (minutes) | 45 | 46 | 50 | 55 | Coarse particles | 43 | 56 | 105 |
| Bulk specific gravity (g/ml) | 0.502 | 0.498 | 0.490 | 0.471 | | 0.525 | 0.507 | 0.485 |
| Average particle size (μm) | 155 | 151 | 153 | 168 | | 149 | 150 | 151 |
| Plasticizer absorption quantity (%) | 34.5 | 34.7 | 35.6 | 33.5 | | 28.2 | 31.7 | 35.4 |

TABLE 1-continued

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Plasticizer absorption (minutes) | 12.6 | 12.5 | 12.0 | 12.9 |  | 14.1 | 13.2 | 12.1 |
| Fish eyes (number) | 0 | 0 | 0 | 0 |  | 5 | 2 | 0 |

What is claimed is:

1. A process for producing a vinyl chloride-based polymer, comprising a suspension polymerization of either vinyl chloride, or a monomer mixture of vinyl chloride and another copolymerizable monomer, in an aqueous medium, and in presence of a dispersion stabilizer, wherein said dispersion stabilizer comprises (A) hydroxypropylmethylcellulose with a degree of methoxy group substitution of 26 to 30% by mass, a degree of hydroxypropoxy group substitution of 4 to 15% by mass, and a viscosity at 20° C. for a 2% by mass aqueous solution thereof of 5 to 4000 mPa·s, (B) a partially saponified polyvinyl alcohol with a saponification degree of 75 to 85 mol % and an average polymerization degree of 1000 to 3000, and (C) a partially saponified polyvinyl alcohol with a saponification degree of 20 to 57 mol % and an average polymerization degree of 150 to 600, said suspension polymerization is initiated in presence of said (A), (B), and (C), and respective quantities of said (A), (B), and (C) at initiation satisfy conditions prescribed by a formula (1) and a formula (2) shown below:

$$\text{mass of } (A)/\text{mass of } (B) = 2 \text{ or greater} \tag{1}$$

and when the polymerization conversion is within a range from 15 to 50%, an additional quantity of said (C) is added to said polymerization reaction system.

2. The process according to claim 1, wherein a quantity of said (C) at initiation of said polymerization is within a range from 0.01 to 0.05 parts by mass per 100 parts by mass of said vinyl chloride or said monomer mixture used, and said additional quantity of said (C) is within a range from 0.01 to 0.07 parts by mass per 100 parts by mass of said vinyl chloride or said monomer mixture used.

3. The process according to claim 1, wherein the quantities of said (A) and (B) at initiation satisfy conditions: mass of (A)/mass of (B) is in a range of 2.3 to 9.

4. The process according to claim 1, wherein when the polymerization conversion is within a range from 25 to 50%, said additional quantity of said (C) is added to said polymerization reaction system.

5. The process according to claim 1, wherein at the initiation of the polymerization said (A) is present in a quantity of 0.02 to 0.2% by mass, and said (B) is present in a quantity of 0.001 to 0.1% by mass, per 100 parts by mass of said vinyl chloride or said monomer mixture used.

6. The process according to claim 1, wherein when the polymerization conversion is within a range from 15 to 50%, the additional quantity of said (C) is 0.02 to 0.06 parts by mass per 100 parts by mass of said vinyl chloride or said monomer mixture used.

7. The process according to claim 4, wherein at the initiation of the polymerization said (A) is present in a quantity of 0.02 to 0.2% by mass, and said (B) is present in a quantity of 0.001 to 0.1% by mass, per 100 parts by mass of said vinyl chloride or said monomer mixture used.

8. The process according to claim 7, wherein when the polymerization conversion is within a range from 15 to 50%, the additional quantity of said (C) is 0.02 to 0.06 parts by mass per 100 parts by mass of said vinyl chloride or said monomer mixture used.

* * * * *